(12) United States Patent  (10) Patent No.: US 9,087,277 B2
Hwang et al.  (45) Date of Patent: Jul. 21, 2015

(54) APPARATUS AND METHOD FOR DYNAMIC MULTI-DIMENSIONAL CODES WITH TIME AND VISUAL RECOGNITION INFORMATION

(75) Inventors: Jung-Yeon Hwang, Daejeon-si (KR);
Dowon Hong, Daejeon-si (KR);
Ku-Young Chang, Daejeon-si (KR);
Jeong-Woon Choi, Daejeon-si (KR);
Nam-Su Jho, Daejeon-si (KR);
Taek-Young Youn, Seongnam-si (KR);
Hyun-Sook Cho, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 364 days.

(21) Appl. No.: 13/533,925

(22) Filed: Jun. 26, 2012

(65) Prior Publication Data

US 2013/0020393 A1 Jan. 24, 2013

(30) Foreign Application Priority Data

Jul. 22, 2011 (KR) ........................ 10-2011-0073199

(51) Int. Cl.
*G06K 19/06* (2006.01)
(52) U.S. Cl.
CPC ................................ *G06K 19/06112* (2013.01)

(58) Field of Classification Search
USPC .............................. 235/462.11, 494; 705/72
See application file for complete search history.

(56) References Cited

U.S. PATENT DOCUMENTS

| | | | | |
|---|---|---|---|---|
| 2005/0248471 A1* | 11/2005 | Ryu | ................................. | 341/1 |
| 2005/0274804 A1* | 12/2005 | Matsumoto | .............. | 235/462.01 |
| 2007/0187507 A1* | 8/2007 | Natsume et al. | ........... | 235/462.1 |
| 2009/0066689 A1* | 3/2009 | Yamaguchi et al. | .......... | 345/418 |
| 2009/0255992 A1* | 10/2009 | Shen | .......................... | 235/462.1 |
| 2010/0070364 A1* | 3/2010 | Dugan | ....................... | 705/14.43 |
| 2011/0089233 A1* | 4/2011 | Locher | .......................... | 235/380 |
| 2011/0137706 A1* | 6/2011 | Howard et al. | .............. | 705/7.29 |
| 2012/0138671 A1* | 6/2012 | Gaede et al. | .................. | 235/375 |
| 2012/0209749 A1* | 8/2012 | Hammad et al. | ............. | 705/27.1 |
| 2014/0081874 A1* | 3/2014 | Lewis et al. | ..................... | 705/72 |

FOREIGN PATENT DOCUMENTS

| | | |
|---|---|---|
| KR | 10-0455802 B1 | 11/2004 |
| KR | 10-0786347 B1 | 12/2007 |

* cited by examiner

*Primary Examiner* — Allyson Trail

(57) ABSTRACT

A dynamic multi-dimensional code generation and recognition apparatus in which time information and visual recognition information are combined, and a method thereof are provided. According to the present invention, a dynamic multi-dimensional code or a time-variant code including visual recognition information which is associated with source information and changed over time is provided. Accordingly, users may easily ascertain existence of the multi-dimensional code and intended contents of the source information.

13 Claims, 7 Drawing Sheets

APPARATUS AND METHOD FOR DYNAMIC MULTI-DIMENSIONAL CODES WITH TIME AND VISUAL RECOGNITION INFORMATION

CROSS-REFERENCE TO RELATED APPLICATION

This application claims the benefit under 35 U.S.C. §119 (a) of Korean Patent Application No. 10-2011-0073199, filed on Jul. 22, 2011, the entire disclosure of which is incorporated herein by reference for all purposes.

BACKGROUND

1. Field

The following description relates to an information protection and computerization technique, and more particularly, to a technique of generating and displaying multi-dimensional codes, and recognizing the displayed multi-dimensional codes.

2. Description of the Related Art

To visually transmit information and recognize the transmitted information, techniques using multi-dimensional codes are proposed. The multi-dimensional codes are obtained by coding numbers, characters, special characters, and the like using a combination of white and black bar widths, matrixes, figures, patterns, colors, and the like so that the coded numbers, characters, special characters, and the like are easily read in an optical manner. The multi-dimensional codes may integrate data at a high density, and thereby be applied to various fields concerning distribution, identification, medicine, marketing, air carrier, manufacturing, administration, and the like. In addition, the multi-dimensional codes may be a next-generation expression technique which is expected to provide convenience to peoples lives such as in e-commerce using portable multi-functional devices such as a smart phone, etc., internet banking, and the like.

Initial multi-dimensional codes focused on industrial distribution information processes, or applicability in achieving goals such as marketing, etc., through transmission of simple Web addresses, information storage addresses, and the like. However, with the explosive spread of smart phones in recent years, the multi-dimensional codes have been widely used even in application fields involving processing of very complex and high-capacity information such as photos, pictures, bio information, audio information, high-capacity text, moving images, etc.

A variety of multi-dimensional codes are known around the world. QR code in Japan (Denso Wave), PDF417 in US (Symbol Technologies), Data Matrix (International Data Matrix), MaxiCode (UPS), and the like have been adopted as international standards. In order to transmit information using a multi-dimensional code image, low-capacity data of less than several tens of kilobytes may be transmitted using a one-time still image. To transmit large-capacity data of more than several megabytes, hundreds or thousands of multi-dimensional codes or time-variant codes may be used.

Korean Patent No. 10-0455802 discloses a method and apparatus for displaying a time-varying code on a handheld terminal, and a method and apparatus for approval and authentication processing by using the same, and Korean Patent No. 10-0786347 discloses an animation color code providing apparatus and method thereof.

SUMMARY

The following description relates to a multi-dimensional code generation and recognition technique that enables a user to easily ascertain existence of a multi-dimensional code and intended contents of source information by displaying, in the multi-dimensional code or a time-variant code, visual recognition information whose image can change variously over time.

In one general aspect, there is provided a dynamic multi-dimensional code generation apparatus, including: a preprocessing unit that receives source information and visual recognition information for multi-dimensional code generation; and a multi-dimensional code generation unit that combines the received source information and visual recognition information over time to thereby encode the combined information into a plurality of dynamic multi-dimensional codes. Here, the visual recognition information may be dynamic image information which is associated with the source information and changed over time to be visually recognized.

In another general aspect, there is provided a dynamic multi-dimensional code recognition apparatus, including: a multi-dimensional code recognition unit that recognizes a source information code in which predetermined source information is coded, and a dynamic multi-dimensional code including a visual recognition information code having dynamic image information which is associated with the source information and changed over time to be visually recognized; and a decoding unit that decodes the recognized dynamic multi-dimensional code to thereby read the source information.

In another general aspect, there is provided a method of generating a multi-dimensional code by a multi-dimensional code generation apparatus, the method including: separating, from source information, visual recognition information that is dynamic image information which is associated with the source information and changed over time to be visually recognized; and combining the separated source information and visual recognition information over time to thereby encode the combined information into a plurality of dynamic multi-dimensional codes.

In another general aspect, there is provided a method of recognizing a multi-dimensional code by a multi-dimensional code recognition apparatus, the method including: recognizing a source information code in which predetermined source information is coded, and a dynamic multi-dimensional code including a visual recognition information code having dynamic image information which is associated with the source information and changed over time to be visually recognized; and decoding the recognized dynamic multi-dimensional code to thereby read the source information.

In another general aspect, there is provided a dynamic multi-dimensional code, including: a source information code in which predetermined source information is coded; and a visual recognition information code having dynamic image information which is associated with the source information and changed over time to be visually recognized.

Other features and aspects will be apparent from the following detailed description, the drawings, and the claims.

Figure 1:
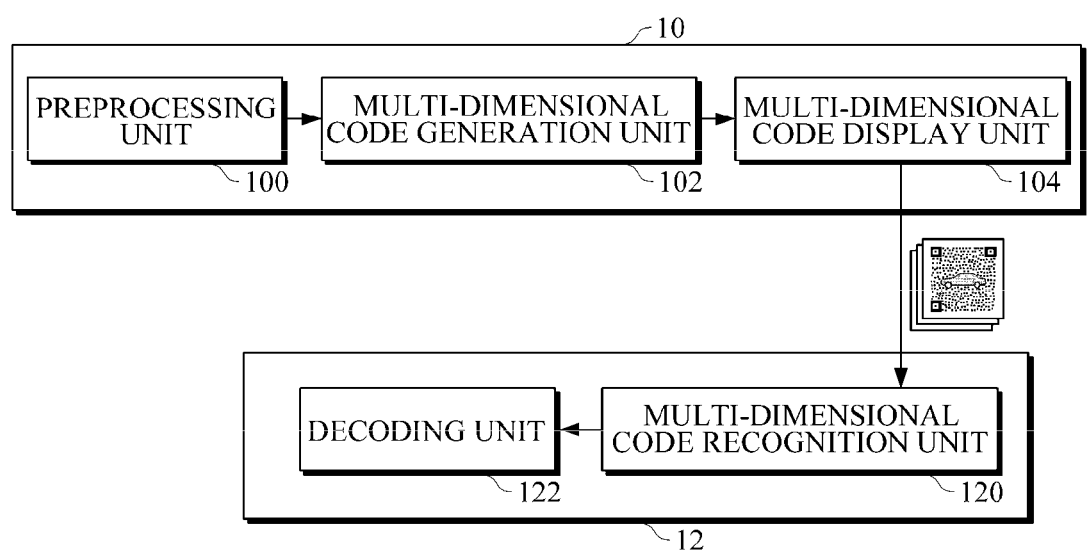
FIG. 1 is a configuration diagram illustrating a dynamic multi-dimensional code generation and recognition system according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

FIG. 1 is a configuration diagram illustrating a dynamic multi-dimensional code generation and recognition system according to an embodiment of the present invention.

Referring to FIG. 1, according to an embodiment of the present invention, a dynamic multi-dimensional code or a time-variant code including visual recognition information which is associated with source information and changed over time is provided. A general multi-dimensional code randomly or complexly displays the source information, or simply and statically displays information which is visually recognizable. However, the multi-dimensional code of the present embodiment displays dynamic image information associated with the source information, for example, moving images such as moving vehicles, logos, characters, and the like, or information concerning dynamic banner advertisements, together with the source information.

Accordingly, a user may easily identify the multi-dimensional codes and ascertain intended contents of the source information.

The multi-dimensional code is at least two-dimensional code. A bar code, which is one dimensional code, is a simple code in which information is aligned only on an x-axis, and the two-dimensional code, in which an x-axis and a y-axis are arranged in a matrix form, provides more information than the one-dimensional code. A QR code is a representative two-dimensional code. A three-dimensional code is a code in which other attributes such as combination of white and black bar widths, matrixes, figures, patterns, colors, and the like in addition to x- and y-axis coordinates are added.

The time-variant code is a code which is changed over time. Examples include a two-dimensional time-variant code, a shape change two-dimensional time-variant code in which a shape of a two-dimensional code pattern is changed over time, a position change two-dimensional time-variant code in which a position of the two-dimensional code pattern is changed over time, a color change two-dimensional time-variant code in which a color of the two-dimensional code pattern is changed over time, and a brightness change two-dimensional time-variant code in which a brightness of the two-dimensional code pattern is changed over time. Alternatively, a two-dimensional time-variant code in which a combination of the shape, the position, the color, and the brightness of the code pattern is changed over time may be given.

For convenience, the following description will focus on the multi-dimensional code, however it applies in the same manner to the time-variant code as well.

Referring to FIG. 1, a dynamic multi-dimensional code generation and recognition system includes a multi-dimensional code generation apparatus 10 and a dynamic multi-dimensional code recognition apparatus 12.

The multi-dimensional code generation apparatus 10 includes a preprocessing unit 100 and a multi-dimensional code generation unit 102, and further includes a multi-dimensional code display unit 104.

The preprocessing unit 100 receives and divides source information and visual recognition information.

The multi-dimensional code generation unit 102 combines the divided source information and visual recognition information over time to thereby encode the combined information into a plurality of multi-dimensional codes.

The multi-dimensional code display unit 104 displays the multi-dimensional code generated through the multi-dimensional code generation unit 102.

The above described configuration may be changed depending on services. That is, the multi-dimensional code generation unit 102 and the multi-dimensional code display unit 104 may be included in a single device, or may be divided into separate devices. The device throughout the invention may be used as a concept of an algorithm which outputs a specific value with respect to a given input value. However, a configuration of participants is not limited thereto. Here, roles of the participants are flexibly separated or integrated by definition of a new subject depending on designed methods, and a new participant may be defined, as necessary.

The preprocessing unit 100 is converted into a dynamic multi-dimensional code to thereby receive the source information to be transmitted and the information which is visually recognizable. The source information may include simple text information and very complex high-capacity information such as photos, pictures, bio information, audio information, high-capacity text, financial information, moving images, or the like.

Subsequently, the preprocessing unit 100 divides corresponding input information into partial information in accordance with a code capacity set in advance, or as necessary. In this instance, the multi-dimensional code generation unit 102 may encode or convert the multi-dimensional code using a multi-dimensional code generation program.

According to an embodiment, the multi-dimensional code generation unit 102 combines, into the multi-dimensional code, visual recognition possible information which is intended by a predetermined method when generating the dynamic multi-dimensional code. The combination of the intended information may be integrally performed when generating the multi-dimensional code. The above described intended information may enhance user recognition of the existence of the multi-dimensional code.

The multi-dimensional code display unit 104 displays the multi-dimensional code generated by the multi-dimensional code generation unit 102.

According to an embodiment, time information is combined with the plurality of multi-dimensional codes, so that the plurality of multi-dimensional codes are consecutively displayed one-by-one in accordance with a predetermined time period or a predetermined time interval. Alternatively, the plurality of multi-dimensional codes is displayed in accordance with a predetermined method.

The time interval may be not the same between consecutive codes constituting the multi-dimensional codes. Alternatively, the time interval may be differently set in accordance with performance of a multi-dimensional code display apparatus, a multi-dimensional code recognition apparatus, or the like.

Meanwhile, the multi-dimensional code recognition apparatus 12 includes a multi-dimensional code recognition unit 120 and a decoding unit 122.

The multi-dimensional code recognition unit 120 recognizes the multi-dimensional code including a source information code and a visual recognition information code.

The visual recognition information code includes dynamic image information which is associated with the source information and changed over time to be visually recognizable.

The decoding unit 122 decodes the multi-dimensional codes recognized by the multi-dimensional code recognition unit 120 to thereby read the source information.

According to an embodiment, the multi-dimensional code recognition unit 120 may scan and read the dynamic multi-dimensional code using a camera or an optical sensor.

To scan the dynamic multi-dimensional code, it is assumed that the multi-dimensional code recognition unit 12 may scan and process all component codes which are consecutively displayed one-by-one in accordance with the predetermined time period or the predetermined time interval.

The multi-dimensional code recognition unit 120 may recognize a multi-dimensional code image using the multi-dimensional code recognition program.

Figure 2:
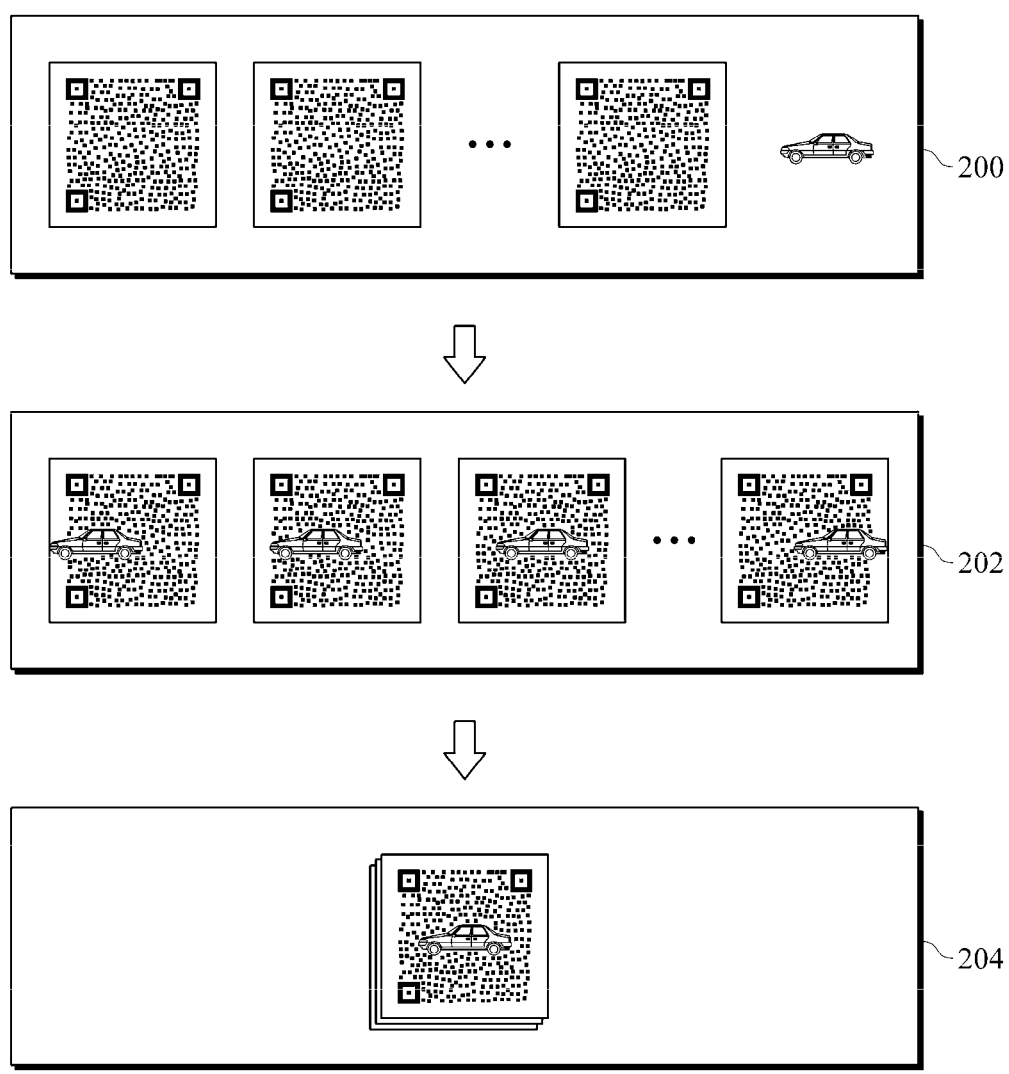
FIG. 2 is a reference diagram illustrating a dynamic multi-dimensional code in which time and visual recognition information are combined according to an embodiment of the present invention.

FIG. 2 is a reference diagram illustrating a dynamic multi-dimensional code in which time and visual recognition information are combined according to an embodiment of the present invention.

The multi-dimensional code according to the present invention includes a source information code in which a predetermined source information is coded, and dynamic image information which is associated with the source information and changed over time to be visually recognizable.

The dynamic image information of the visual recognition information code may be a moving image or a dynamic advertisement which implies the source information or includes a representative image so that a user identifies the multi-dimensional code and ascertains intended contents of the source information.

A method of using a general multi-dimensional code is to simply display and recognize a pattern image which is complexly viewed, but it is difficult to ascertain information itself which is associated with data implied in the multi-dimensional code from the image of the multi-dimensional code. However, the multi-dimensional code according to the present invention may include dynamic images such as visually recognizable characters, pictures, and the like. As a result, it is possible for a user to easily and conveniently recognize and use the multi-dimensional code. In addition, utilizability of the multi-dimensional code may be expanded by combining, with the multi-dimensional code, moving picture images which are different from still images.

Referring to FIG. 2, according to the present invention, the source information and the visual recognition information are separated in block 200, the separated source information and visual recognition information are combined over time in block 202, and the combined information is encoded into a plurality of multi-dimensional codes in block 204.

In FIG. 2, as an example of the visually recognizable information, a moving vehicle image is combined with the dynamic multi-dimensional code to be displayed. A user of the code may recognize and determine that product information or public relations contents associated with the vehicle are present when the moving vehicle image is viewed by the user, and receive detailed information through the dynamic multi-dimensional code which is displayed together.

According to the present invention, through the multi-dimensional code in which the time information and the visual recognition information are combined, a user may identify the multi-dimensional code and easily recognize existence of the identified multi-dimensional code. The multi-dimensional code may be expected to be significantly utilized as a convenient and smart information transmission medium among smart devices, beyond a simple role of acting to connect online and offline.

In a smart computing environment including PCs, laptops, smart pads, kiosks, bank ATMs, outdoor billboards, and the like, a large number of multi-dimensional codes may be displayed all at once, for example, through Web pages. Accordingly, separating the multi-dimensional codes from each other in an easy and rapid manner to be used is a very important issue. In addition, in this environment, enabling users to easily recognize existence of the multi-dimensional code by information transmitters using the multi-dimensional code is also an important issue. According to the present invention, as the multi-dimensional code in which the time information and the visual recognition information are combined is provided, the user may easily identify the multi-dimensional code.

According to another embodiment, in the dynamic image information of the visual recognition information code which is changed over time, a time period or a time interval which is displayed in accordance with a processing performance of at least one of a multi-dimensional code display apparatus and a multi-dimensional code recognition apparatus may be changed.

For example, when the multi-dimensional code recognition apparatus can provide high image quality and scan performance, a short time period may be used, and in this case, the dynamic multi-dimensional code which is displayed in the multi-dimensional code display apparatus may create a visually rapid movement such as in a general moving image. As another example, the multi-dimensional code may be displayed such as in Internet banner advertisements. As another example, when using a long time period between the component codes, the dynamic multi-dimensional code displayed on the multi-dimensional code display apparatus may create a visually slow-speed movement.

According to another embodiment, the multi-dimensional code includes an index information code having an order or connection index information between a plurality of dynamic multi-dimensional codes in which the source information and the dynamic image information are combined. In this case, the multi-dimensional code is displayed in accordance with the order or a connection index relationship between the multi-dimensional codes, which is set in advance.

According to another embodiment, the multi-dimensional code includes a security and authentication code which authenticates a user or a user terminal. That is, when displaying the plurality of multi-dimensional codes, a variety of security and authentication functions may be provided. The security and authentication function may include personal confidential information, watermarks, signatures, cryptography, and the like, and may also include a variety of information and methods capable of enhancing security and authentication effects, but the present invention is not limited thereto.

Figure 3:
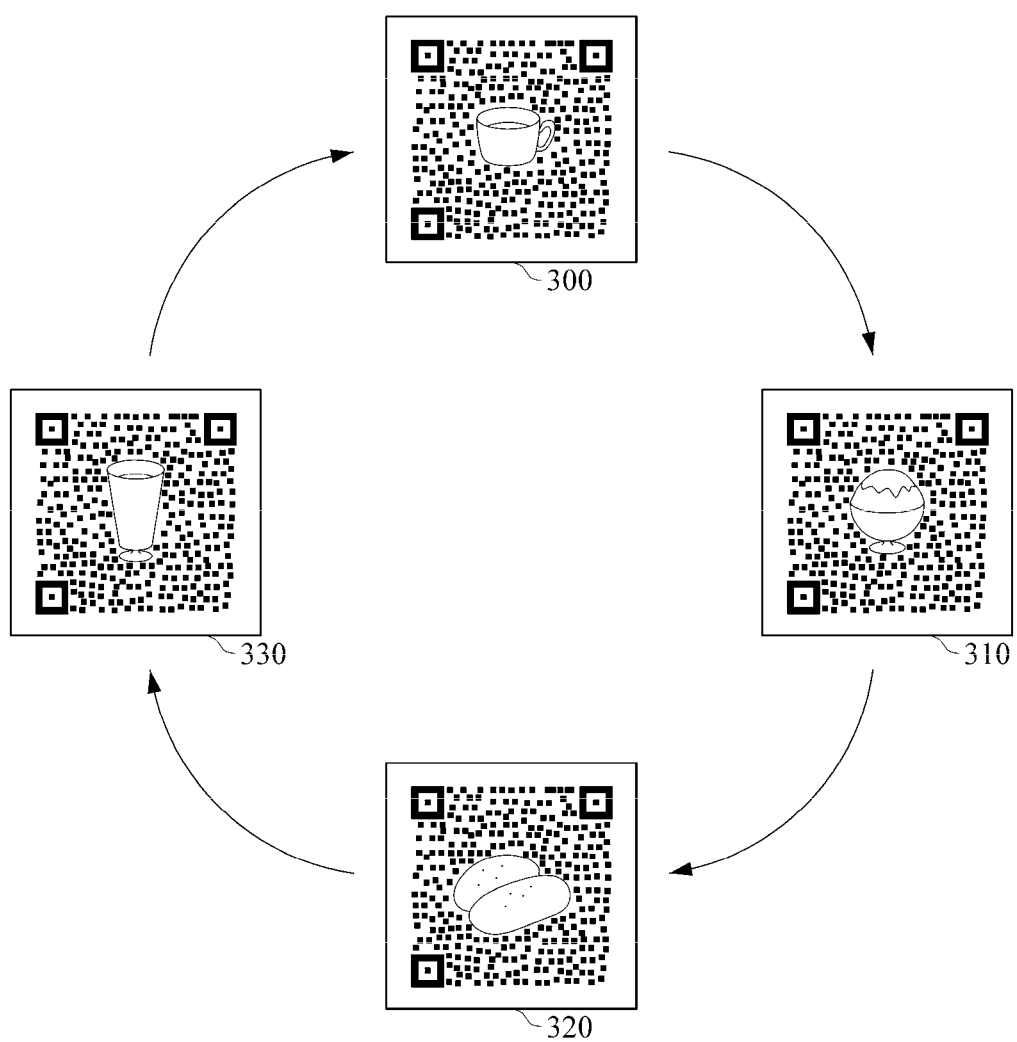
FIG. 3 is a reference diagram illustrating an example in which a multi-dimensional code according to an embodiment of the present invention is applied.

FIG. 3 is a reference diagram illustrating an example in which a multi-dimensional code according to an embodiment of the present invention is applied.

Referring to FIG. 3, the multi-dimensional code according to the present embodiment includes dynamic images such as visually recognizable characters, pictures, and the like. For example, as illustrated in FIG. 3, a visual recognition information code including coffee 300, patbingsu 310, bread 320, and fruit juice 330, which are dynamic images through which a source code of the multi-dimensional code associated with a coffee shop is verified, may be combined with the source code to be displayed. As a result, users may easily and conveniently recognize that the multi-dimensional code is associated with the coffee shop through the dynamic images of the multi-dimensional code.

Figure 4:
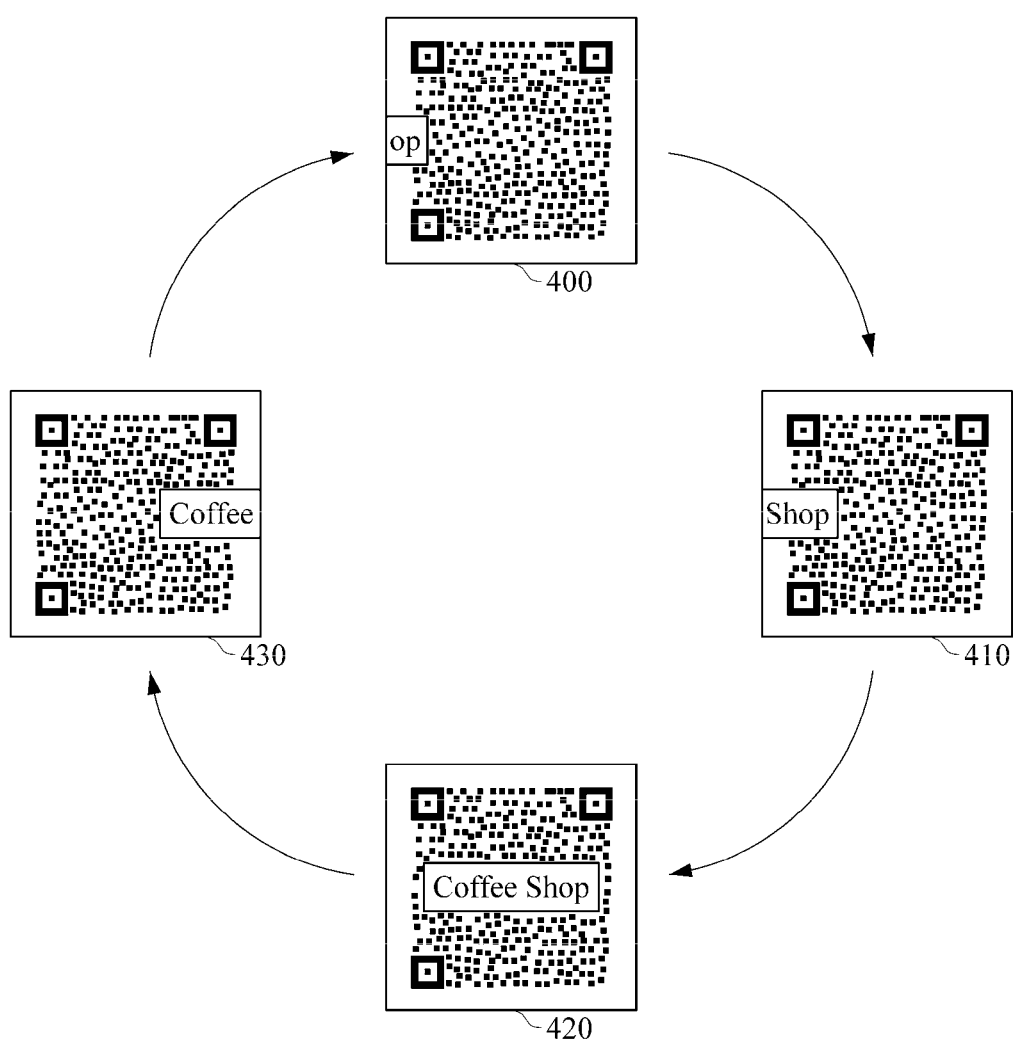
FIG. 4 is a reference diagram illustrating an example in which a multi-dimensional code according to another embodiment of the present invention is applied.

FIG. 4 is a reference diagram illustrating an example in which a multi-dimensional code according to another embodiment of the present invention is applied.

Referring to FIG. 4, the multi-dimensional code according to the present embodiment may include a variety of dynamic images that can enhance advertisement and public relations effects such as in banner advertisements currently viewed on the Internet. For example, as illustrated in FIG. 4, visual recognition information codes 400, 410, 420, and 430 including a banner advertisement which advertises a corresponding coffee shop are combined with the source code associated with the coffee shop of the multi-dimensional code to thereby be dynamically displayed. As a result, users may easily and conveniently recognize that the multi-dimensional code is associated with the coffee shop.

Figure 5:
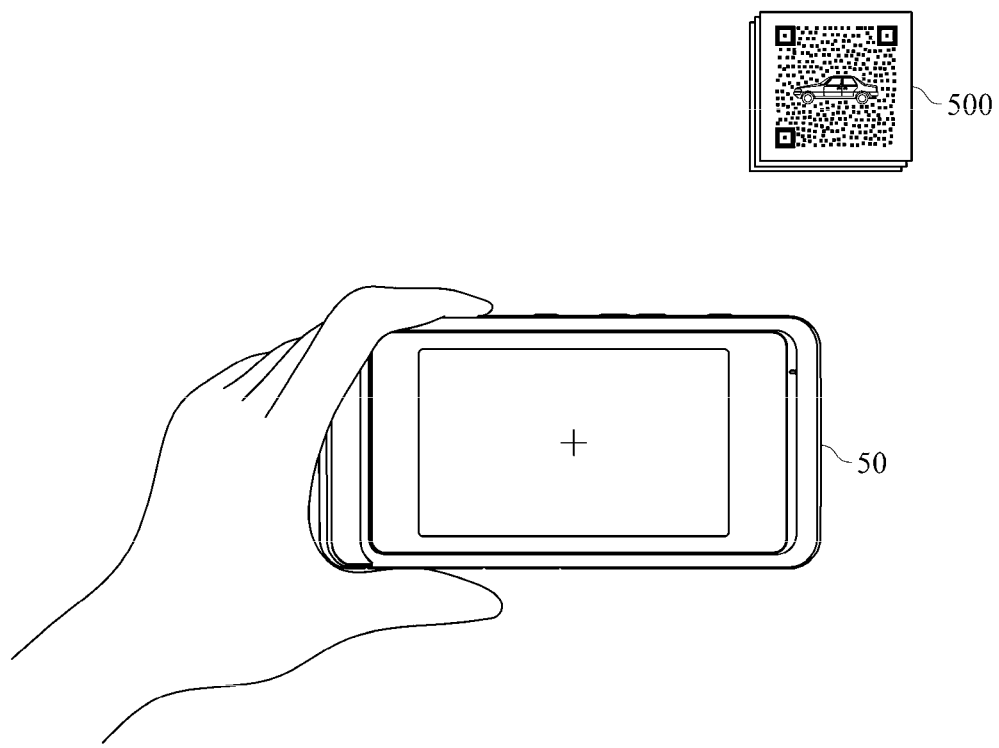
FIG. 5 is a reference diagram illustrating an example of recognizing a multi-dimensional code through a portable multifunctional device according to an embodiment of the present invention.

FIG. 5 is a reference diagram illustrating an example of recognizing a multi-dimensional code through a portable multifunctional device according to an embodiment of the present invention.

Referring to FIG. 5, the multi-dimensional code recognition apparatus according to the present embodiment recognizes a multi-dimensional code using a camera or an optical sensor.

In FIG. 5, an example in which a multi-dimensional code 500 is recognized using a camera mounted in a portable multifunctional device 50 is illustrated, but a recognition means is not limited thereto.

The camera which is mounted in mobile phones, laptops, and the like, to photograph pictures and moving images, has been widely distributed, so that users may easily use such a device in their daily lives, such as using video telephony in a desktop PC through a webcam, and the like. In the portable multifunctional devices, and the like, including most smart phones and smart devices, programs capable of recognizing the multi-dimensional code, and the like, have been distributed, and therefore, users are familiar with the use of the multi-dimensional code.

A device mounting the camera capable of recognizing the multi-dimensional code may always obtain information through the multi-dimensional code, and therefore, users may very conveniently process information without a separate communication network or a burden of communication charges when using corresponding devices.

In addition, a method of recognizing the multi-dimensional code using the camera is performed in a contactless manner, and therefore, devices such as a separate connection cable, and the like are not required, thereby implementing user-friendly services.

Figure 6:
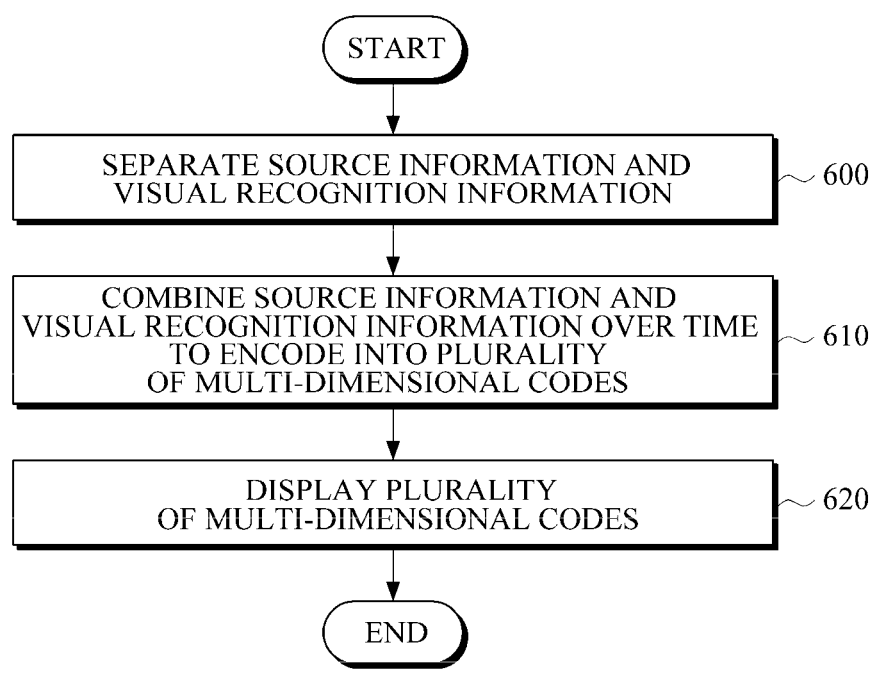
FIG. 6 is a flowchart illustrating a multi-dimensional code generation method according to an embodiment of the present invention.

FIG. 6 is a flowchart illustrating a multi-dimensional code generation method according to an embodiment of the present invention.

Referring to FIGS. 1 and 6, in step 600, the multi-dimensional code generation apparatus 10 separates source information and visual recognition information, that is, dynamic image information which is associated with the source information and changed over time to be visually recognized.

The dynamic image information of a visual recognition information code may be a moving image or a dynamic advertisement which implies the source information or includes a representative image so that a user identifies the dynamic multi-dimensional code and ascertains intended contents of the source information.

Next, in step 610, the multi-dimensional code generation apparatus 10 combines the separated source information and visual recognition information over time to thereby encode the combined information into a plurality of dynamic multi-dimensional codes.

In step 610, the multi-dimensional code generation apparatus 10 may determine time information including a time period or a time interval in accordance with a processing performance of at least one of a dynamic multi-dimensional code display apparatus and a dynamic multi-dimensional code recognition apparatus, and combine the determined time information with the dynamic multi-dimensional code.

In addition, in step 610, the multi-dimensional code generation apparatus 10 may include an order or connection index information between the plurality of dynamic multi-dimensional codes in which the source information and the dynamic image information are combined, and encode the combined information into the plurality of dynamic multi-dimensional codes. In this case, the multi-dimensional code may be changed over time in accordance with the order or the connection index information between the plurality of dynamic multi-dimensional codes.

In addition, in step 610, the multi-dimensional code generation apparatus 10 may combine security and authentication information to thereby encode the combined information into the plurality of dynamic multi-dimensional codes.

Next, in step 620, the multi-dimensional code generation apparatus 10 displays the plurality of generated dynamic multi-dimensional codes.

Figure 7:
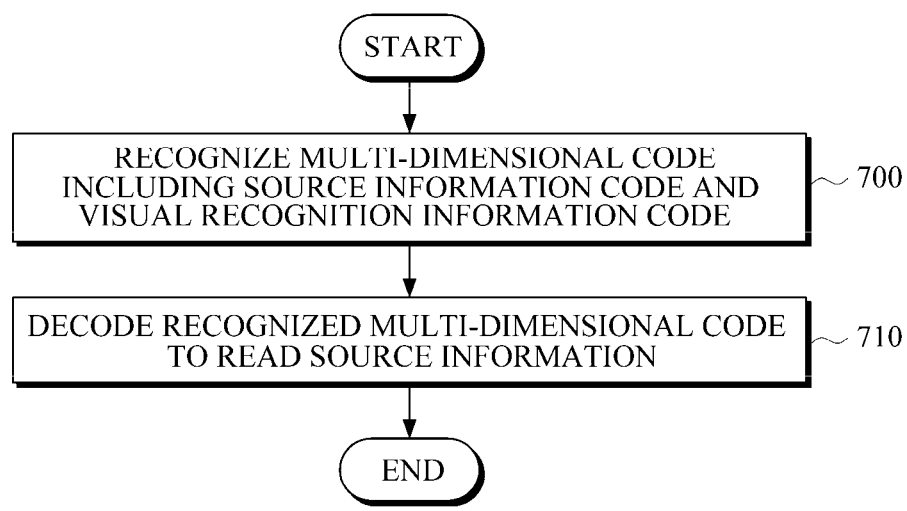
FIG. 7 is a flowchart illustrating a multi-dimensional code recognition method according to an embodiment of the present invention.

FIG. 7 is a flowchart illustrating a multi-dimensional code recognition method according to an embodiment of the present invention.

Referring to FIGS. 1 and 7, in step 700, the multi-dimensional code recognition apparatus 12 recognizes a source information code in which predetermined source information is coded, and a dynamic multi-dimensional code including a visual recognition information code having dynamic image information which is associated with the source information and changed over time to be visually recognized.

Here, the multi-dimensional code may be recognized using a camera or an optical sensor.

Next, in step 710, the multi-dimensional code recognition apparatus 12 decodes the recognized dynamic multi-dimensional code to thereby read the source information.

Accordingly, user recognition of the existence of the multi-dimensional code may be enhanced, and a variety of information transmission effects may be additionally obtained through the multi-dimensional code.

As described above, according to the embodiments of the present invention, the visual recognition information whose image can change variously over time may be displayed in the multi-dimensional code or the time-variant code, so that users may easily identify the multi-dimensional code and ascertain intended contents of the source information. This stands in contrast with multi-dimensional codes that randomly and complexly display the source information or simply and statically display visually recognizable information.

In particular, a moving image or a dynamic advertisement which implies the source information or includes a representative image may be displayed in the multi-dimensional code, so that users may identify the multi-dimensional code and easily and rapidly ascertain intended contents of the source information.

In addition, a variety of information may be additionally transmitted through the multi-dimensional code, and security of the multi-dimensional code may be enhanced by combining the security and authentication function with the multi-dimensional code.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A dynamic multi-dimensional code generation apparatus, comprising:
   a preprocessing unit that receives source information and visual recognition information associated with the source information; and
   a multi-dimensional code generation unit that combines the received source information and visual recognition information over time to encode the combined information into a plurality of dynamic multi-dimensional codes, the visual recognition information including visually recognizable image information that changes over time and is representative of the source information,
   wherein the multi-dimensional code generation unit determines time information including a time period or a time interval in accordance with a processing performance of at least one of a dynamic multi-dimensional code display apparatus and a dynamic multi-dimensional code recognition apparatus, and combines the determined time information to the dynamic multi-dimensional code.

2. The dynamic multi-dimensional code generation apparatus according to claim 1, wherein the dynamic image information of the visual recognition information is a moving image or a dynamic advertisement.

3. The dynamic multi-dimensional code generation apparatus according to claim 1, wherein the multi-dimensional code generation unit includes an order or connection index information between the plurality of dynamic multi-dimensional codes in which the source information and the dynamic image information are combined, and encodes the combined information to the plurality of dynamic multi-dimensional codes so that the dynamic multi-dimensional code is changed in accordance with the order or the connection index information between the plurality of dynamic multi-dimensional codes.

4. The dynamic multi-dimensional code generation apparatus according to claim 1, wherein the multi-dimensional code generation unit combines security and authentication information to thereby encode the combined information into the plurality of dynamic multi-dimensional codes.

5. The dynamic multi-dimensional code generation apparatus according to claim 1, further comprising:
   a multi-dimensional code display unit that displays the plurality of generated dynamic multi-dimensional codes.

6. A dynamic multi-dimensional code recognition apparatus, comprising:
   a multi-dimensional code recognition unit that recognizes:
   a source information code in which predetermined source information is coded and a dynamic multi-dimensional code including a visual recognition information code having dynamic image information, the dynamic image information including visually recognizable image information that changes over time and is representative of the predetermined source information; and that determines:
   time information including a time period or a time interval in accordance with a processing performance of at least one of a dynamic multi-dimensional code display apparatus and a dynamic multi-dimensional code recognition apparatus, and combines the determined time information to the dynamic multi-dimensional code; and
   a decoding unit that decodes the recognized dynamic multi-dimensional code to thereby read the source information.

7. The dynamic multi-dimensional code recognition apparatus according to claim 6, wherein the multi-dimensional code recognition unit recognizes the dynamic multi-dimensional code using a camera or an optical sensor.

8. A method of recognizing a multi-dimensional code by a multi-dimensional code recognition apparatus, the method comprising:
   recognizing a source information code in which predetermined source information is coded, and a dynamic multi-dimensional code including a visual recognition information code having dynamic image information, the dynamic image information including visually recognizable image information that changes over time and is representative of the predetermined source information,
   wherein the visual recognition information code combines time information including a time period and a time interval in which the dynamic multi-dimensional code is displayed, and is displayed in accordance with the combined time information; and
   decoding the recognized dynamic multi-dimensional code to thereby read the source information.

9. A dynamic multi-dimensional code, comprising:
   a source information code in which predetermined source information is coded; and
   a visual recognition information code having dynamic image information, the dynamic image information including visually recognizable images that change over time and are representative of the predetermined source information, the visual recognition information code combining time information including a time period and a time interval in which the dynamic multi-dimensional code is displayed, and is displayed in accordance with the combined time information.

10. The dynamic multi-dimensional code according to claim 9, wherein the dynamic image information of the visual recognition information is a moving image or a dynamic advertisement.

11. The dynamic multi-dimensional code according to claim 9, wherein the time period and the time interval are determined in accordance with a processing performance of at least one of a dynamic multi-dimensional code display apparatus and a dynamic multi-dimensional code recognition apparatus.

12. The dynamic multi-dimensional code according to claim 9, further comprising:

an index information code including an order or connection index information between a plurality of dynamic multi-dimensional codes in which the source information and the dynamic image information are combined.

13. The dynamic multi-dimensional code according to claim 9, further comprising:

security and authentication information which authenticates a user or a user terminal.

* * * * *